(12) United States Patent
Xie

(10) Patent No.: US 10,688,677 B2
(45) Date of Patent: Jun. 23, 2020

(54) CUTTING TOOL

(71) Applicant: MILWAUKEE ELECTRIC TOOL CORPORATION, Brookfield, WI (US)

(72) Inventor: Jia Le Xie, Dongguan (CN)

(73) Assignee: Milwaukee Electric Tool Corporation, Brookfield, WI (US)

(*) Notice: Subject to any disclaimer, the term of this patent is extended or adjusted under 35 U.S.C. 154(b) by 0 days.

(21) Appl. No.: 15/926,736

(22) Filed: Mar. 20, 2018

(65) Prior Publication Data

US 2018/0290323 A1   Oct. 11, 2018

(30) Foreign Application Priority Data

Apr. 7, 2017   (CN) ............ 2017 1 0224909

(51) Int. Cl.
   *B26D 3/16*   (2006.01)
   *B23D 21/08*   (2006.01)

(52) U.S. Cl.
   CPC ............ *B26D 3/169* (2013.01); *B23D 21/08* (2013.01)

(58) Field of Classification Search
   CPC ......... B23D 21/08; B23D 21/04; B26D 3/169
   USPC ....... 30/93–103; D8/60, 312; D21/308, 443; 116/299
   See application file for complete search history.

(56) References Cited

U.S. PATENT DOCUMENTS

| | | |
|---|---|---|
| 1,393,156 A | 10/1921 | Nonneman |
| 2,697,875 A | 12/1954 | McIver |
| 2,796,663 A | 6/1957 | Karnes |
| 2,956,339 A | 10/1960 | Jonasson |
| 3,347,118 A | 10/1967 | Gore et al. |
| 3,757,823 A | 9/1973 | Knutson |
| 3,783,901 A | 1/1974 | Schneider et al. |
| 4,201,116 A | 5/1980 | Martin |
| 4,485,846 A | 12/1984 | Neff |
| 4,493,150 A | 1/1985 | Garcia et al. |
| 4,596,271 A | 6/1986 | Brundage |
| 4,831,732 A | 5/1989 | Garton |
| 5,285,576 A | 2/1994 | Taylor |

(Continued)

FOREIGN PATENT DOCUMENTS

| | | |
|---|---|---|
| AU | 2005302213 A1 | 5/2006 |
| AU | 2016323422 | 4/2018 |

(Continued)

OTHER PUBLICATIONS

International Search Authority, "International Search Report and Written Opinion," issued in connection with International Patent Application No. PCT/US2016/051982, dated Jan. 9, 2017, 10 pages.

(Continued)

*Primary Examiner* — Laura M Lee
(74) *Attorney, Agent, or Firm* — Reinhart Boerner Van Deuren s.c.

(57) ABSTRACT

A cutting tool includes a housing having a blade opening and a biasing member having a securing portion, an engaging portion, and a semi-circular body portion in between the securing portion and the engaging portion. The securing portion secures the biasing member to the housing within the housing and the engaging portion extends away from the body portion. An annular blade is biased by the engaging portion towards the opening and against the housing, with the blade at least partially extending through the blade opening.

16 Claims, 3 Drawing Sheets

(56) References Cited

U.S. PATENT DOCUMENTS

| | | |
|---|---|---|
| 5,366,202 A | 11/1994 | Lunzman |
| 5,520,217 A | 5/1996 | Grawunde |
| 5,605,289 A | 2/1997 | Maley et al. |
| 5,632,258 A | 5/1997 | Tsuzuki et al. |
| 5,865,156 A | 2/1999 | Feucht et al. |
| 5,903,980 A | 5/1999 | Collier et al. |
| 6,024,060 A | 2/2000 | Buehrle, II et al. |
| 6,026,791 A | 2/2000 | Arnold |
| 6,050,248 A | 4/2000 | Arulraja et al. |
| 6,173,684 B1 | 1/2001 | Buehrle, II et al. |
| 6,178,956 B1 | 1/2001 | Steinmann et al. |
| 6,182,646 B1 | 2/2001 | Silberstein et al. |
| 6,345,444 B1 | 2/2002 | Gillet et al. |
| 6,393,700 B1 | 5/2002 | Babb |
| D464,244 S | 10/2002 | Lira-Nunez |
| 6,601,821 B2 | 8/2003 | Tyler |
| D556,528 S | 12/2007 | Huang |
| 7,406,769 B1 | 8/2008 | Toussaint |
| 7,743,510 B2 | 6/2010 | Lazarevic |
| D640,520 S | 6/2011 | Rampling |
| 8,573,099 B2 | 11/2013 | Huang |
| 8,601,697 B2 | 12/2013 | Whittaker |
| 8,800,151 B2 | 8/2014 | Lee |
| D808,756 S | 1/2018 | Hyma et al. |
| 2006/0085987 A1 | 4/2006 | Gordon |
| 2006/0092674 A1 | 5/2006 | Belton et al. |
| 2007/0180701 A1 | 8/2007 | Hutt |
| 2010/0088898 A1 | 4/2010 | Thorson et al. |
| 2011/0179646 A1 | 7/2011 | Park |
| 2011/0179649 A1 | 7/2011 | Park |
| 2012/0023752 A1 | 2/2012 | Rampling et al. |
| 2012/0247286 A1* | 10/2012 | Huang ............... B23D 21/08 82/60 |

FOREIGN PATENT DOCUMENTS

| | | |
|---|---|---|
| CA | 2585936 A1 | 5/2006 |
| CN | 201140411 Y | 10/2008 |
| CN | 201300246 Y | 9/2009 |
| CN | 201815741 U | 5/2011 |
| CN | 102133658 A | 7/2011 |
| CN | 203140869 U | 8/2013 |
| CN | 203863122 U | 10/2014 |
| GB | 2288353 | 10/1995 |
| GB | 2455367 | 5/2012 |
| IN | 200701777 P2 | 10/2007 |
| JP | 2008518794 A | 6/2008 |
| KR | 20070097427 A | 10/2007 |
| MX | 2007005227 | 7/2007 |
| TW | 200924883 A | 6/2009 |
| WO | WO2002002264 A1 | 1/2002 |
| WO | WO2006050377 A2 | 5/2006 |
| WO | WO2006050377 A3 | 5/2006 |
| WO | WO2017/048986 | 3/2017 |

OTHER PUBLICATIONS

Superior Tool Company, "3/4" Quick Cut," Specification, 2010, 1 page.

Superior Tool Company, "1/2" Quick Cut," Specification, 2010, 1 page.

* cited by examiner

CUTTING TOOL

FIELD OF THE INVENTION

The present invention relates to cutting tools, and more particularly to swing cutting tools.

BACKGROUND OF THE INVENTION

Some cutting tools use a blade with a cutting portion to perform a circumferential cut around an area of piping or tubing. The blade rides along rails within the tool's housing and is biased by a biasing member in a direction of the piping or tubing.

SUMMARY OF THE INVENTION

The present invention provides, in one aspect, a cutting tool comprising a housing having a blade opening, a biasing member including a securing portion, an engaging portion, and a semi-circular body portion in between the securing portion and the engaging portion. The securing portion secures the biasing member to the housing within the housing and the engaging portion extends away from the body portion. An annular blade is biased by the engaging portion towards the opening and against the housing and the blade at least partially extends through the blade opening.

The present invention provides, in another aspect, a cutting tool comprising a housing having a blade opening, a biasing member including a securing portion, an engaging portion, and an arcuate body portion in between the securing portion and the engaging portion. The securing portion secures the biasing member to the housing within the housing and the engaging portion extends away from the body portion. A first arcuate rail is arranged within the housing and a second arcuate rail is arranged within the housing. The cutting tool further comprises a blade having a first side including a first shoulder and a first axle extending outwardly from the first shoulder. The blade has a second side opposite the first side and including a second shoulder and a second axle extending outwardly from the second shoulder. The first shoulder faces the first rail and the second shoulder faces the second rail. The first axle and the second axle jointly define an axis. The blade is biased by the engaging portion such that the first axle is engaged against the first rail and the housing, the second axle is engaged against the second rail and the housing, and at least a portion of the blade extends out of the blade opening.

The present invention provides, in yet another aspect, a cutting tool comprising a housing having C-shaped profile, a blade opening, and a roller opening. A roller is rotatably coupled to the housing and configured to rotate within the roller opening. The cutting tool includes a biasing member including a securing portion, an engaging portion, and an arcuate body portion in between the securing portion and the engaging portion. The securing portion secures the biasing member to the housing within the housing and the engaging portion extends away from the body portion. The cutting tool also includes a first arcuate rail arranged within the housing and a second arcuate rail arranged within the housing. The cutting tool includes a blade having a first side including a first shoulder and a first axle extending outwardly from the first shoulder. The blade has a second side opposite the first side and including a second shoulder and a second axle extending outwardly from the second shoulder. The first shoulder faces the first rail and the second shoulder faces the second rail. The blade is biased by the engaging portion such that the first axle is engaged against the first arcuate rail and the housing, the second axle is engaged against the second arcuate rail and the housing, and at least a portion of the blade extends out of the blade opening.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
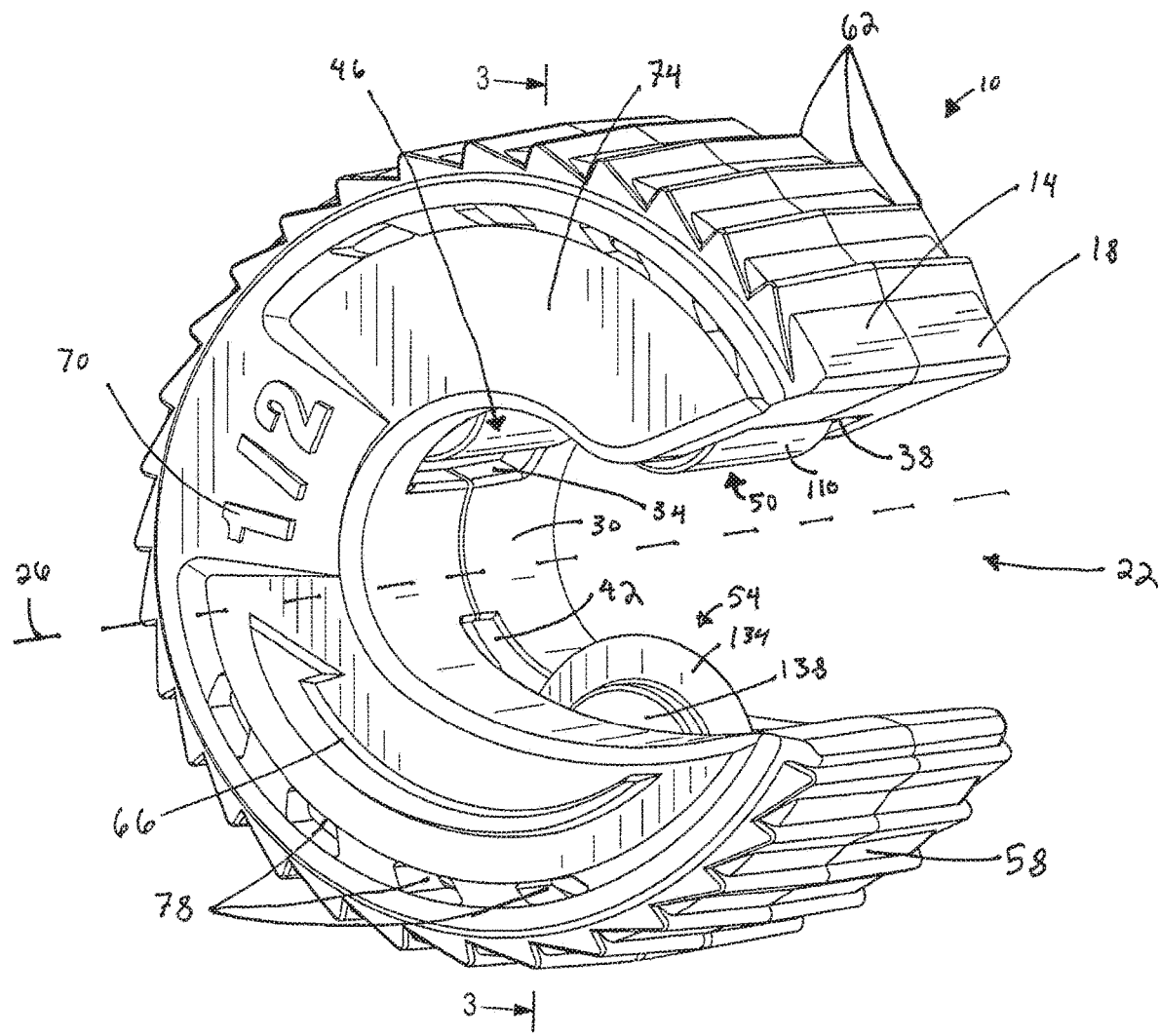
FIG. 1 is a perspective view of a cutting tool.

As shown in FIG. 1, a cutting tool 10 for cutting tubing or piping is provided. The tool 10 has a right housing 14 and a left housing 18 which mate in a generally "C-shaped" profile, with an opening 22 defined in the profile to allow the tool 10 be inserted onto a length of tubing or piping. The opening 22 helps defines a longitudinal axis 26 of the length of tubing or piping to be cut. An inner radial surface 30 formed by the right and left housings 14, 18 defines a first roller opening 34, a second roller opening 38, and an elongated blade opening 42. A first roller 46 extends through the first roller opening 34, a second roller 50 extends through the second roller opening 38, and a blade 54 extends through the blade opening 42.

With continued reference to FIG. 1, an outer radial surface 58 is provided with a plurality of ribs or ridges 62 to allow an operator to more easily grip the tool 10. In some embodiments, the ribs or ridges 62 slope in a certain direction to help an operator identify which direction the tool 10 should be rotated to make a cut. The right housing 14 or left housing 18 may include indicia 66, 70 to respectively help the operator identify the rotation direction and the diameter of piping or tubing the tool 10 is configured to cut. Opposite side surfaces 74 define a plurality of weep holes 78 to allow water accumulated in the tool 10 during operation to drain.

Figure 2:
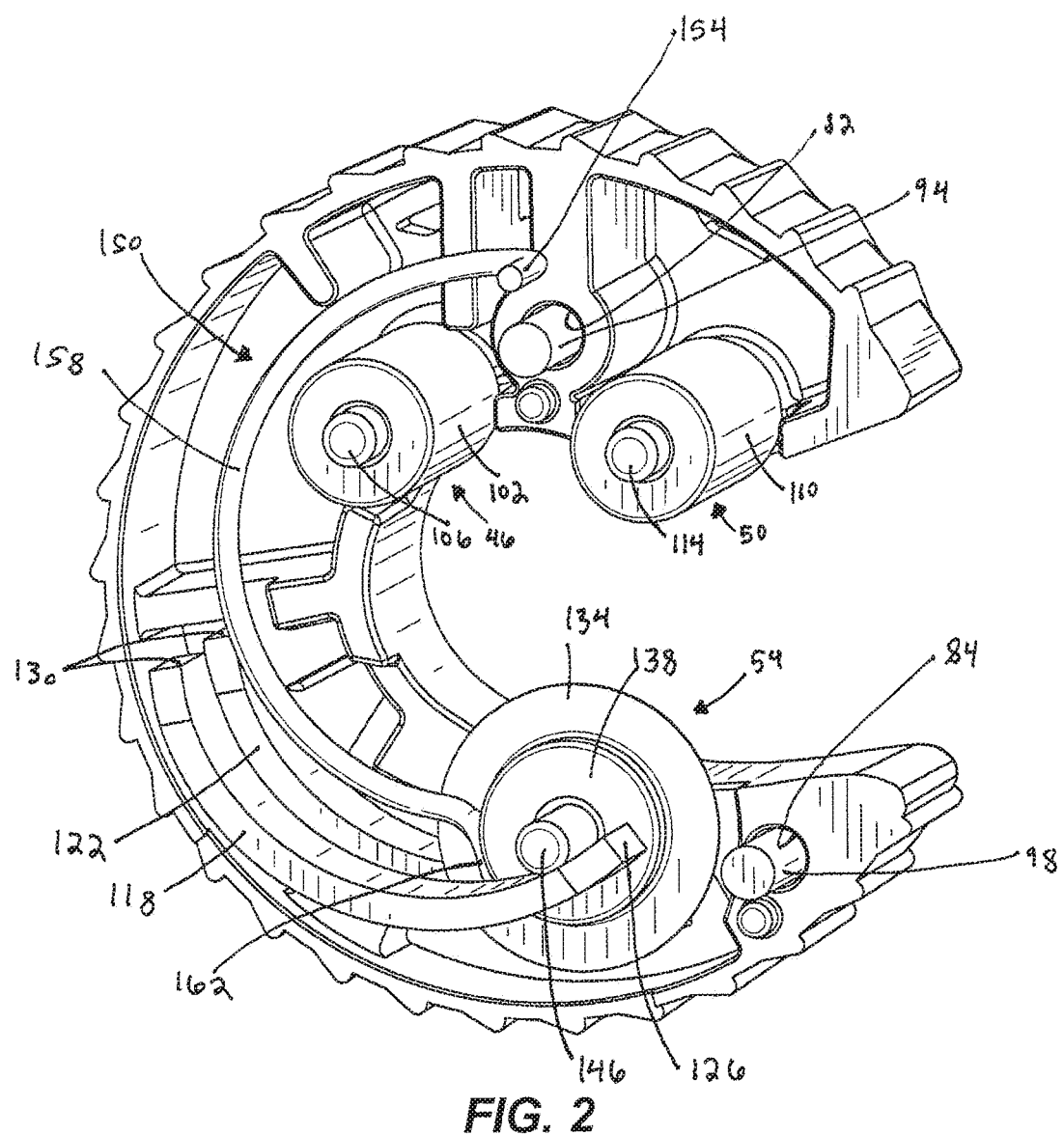
FIG. 2 is a perspective view of the cutting tool of FIG. 1 with the right housing removed.

As shown in FIG. 2, the left housing 18 provides a first bore 82 and a second bore 84, which align with a corresponding first bore 90 and second bore (not shown) of the right housing 14 when the left housing 18 is aligned with the right housing 14. In some embodiments, all the bores are aligned parallel to the longitudinal axis 26. When the bores of both houses 14, 18 are aligned, a first fastener 94 is set through the aligned first bores 82, 90 and a second fastener 98 is set through the aligned second bores to securely mate the right housing 14 to the left housing 18. In some embodiments, the bores and the fasteners may be threaded.

The first roller 46 has a first roller body 102, in the form of a cylinder extending in a direction parallel to the longitudinal axis 26, and a pair of first axles 106, extending axially from opposite ends of the first roller body 102. The right and left housing 14, 18 each include a first axle recess (not shown) to receive each of the first axles 106 of the first roller when the right and left housing 14, 18 are securely mated. The first axle recesses of the right and left housing 14, 18 are arranged so as to align the first roller 46 in a direction that is parallel to the longitudinal axis 26 when the first axles 106 are set in the first axle recesses. The first axle recesses also permit the first roller 46 to roll freely within the first roller opening 34.

The second roller 50 has a second roller body 110, in the form of a cylinder extending in a direction parallel to the longitudinal axis 26, and a pair of second axles 114, extending axially from opposite ends of the second roller body 110. The right and left housing 14, 18 each include a second axle recess (not shown) to receive each of the second axles 114 of the second roller when the right and left housing 14, 18 are securely mated. The second axle recesses of the right and left housing 14, 18 are arranged so as to align the second roller 50 in a direction that is parallel to the longitudinal axis 26 when the second axles 114 are set in the second recesses. The second axle recesses also permit the second roller 50 to roll freely within the second roller opening 38.

With continued reference to FIG. 2, the right housing 14 includes an arcuate right rail 118 and the left housing 18 includes an arcuate left rail 122. The right and left rails 118, 122 are located within the right and left housings 14, 18 and each rail 118, 122 has a first end 126 and second end 130. The blade 54 has a cutting portion 134, a right shoulder 138, a left shoulder 142, and right and left blade axles 146, 148 respectively extending axially from the right and left shoulders 138, 142 in a direction parallel to the longitudinal axis 26. The rails 118, 122 are arranged at a certain distance from the blade opening 42, such that only a portion of the shoulders 138, 142 and the cutting portion 134 extend through the blade opening 42 as the right and left blade axles 146, 148 slide and/or rotate along the right and left rails 118, 122 between the first and second ends 126, 130.

Figure 3:
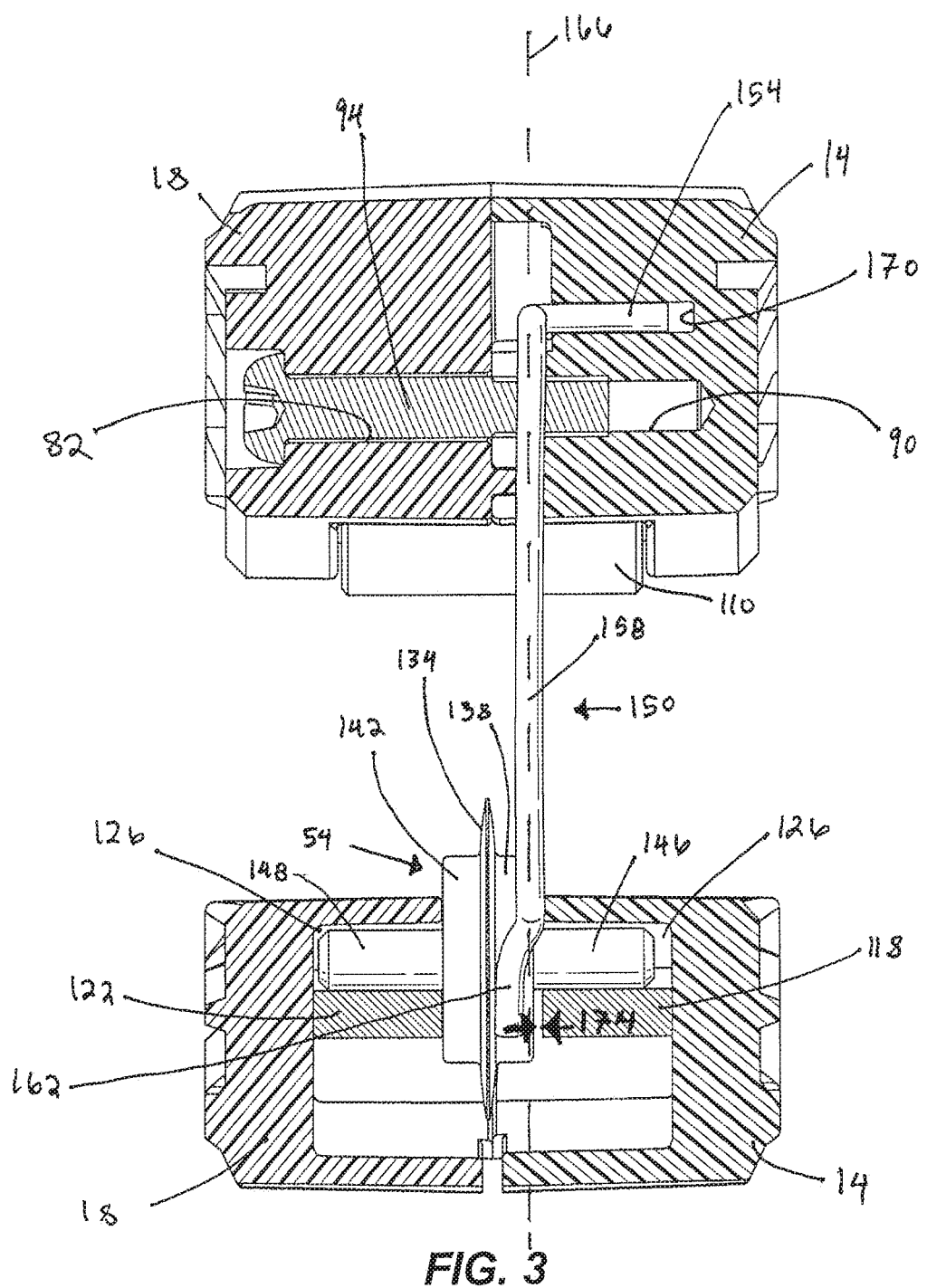
FIG. 3 is a cross-section taken along the line 3-3 of FIG. 1

A biasing member 150, such as a partial torsion spring, is arcuately arranged within the right and left housings 14, 18 along the C-shaped profile of the tool 10. The biasing member 150 has a securing portion 154, an arcuate body portion 158, and an engaging portion 162. As shown in FIG. 3, in some embodiments the arcuate body portion is semi-circular. In the embodiment shown in FIG. 3, the arcuate body portion has a semi-circular shape that extends between the securing portion 154 and the engaging portion 162 for approximately 180 degrees.

As shown in FIG. 3, the engaging portion 162 extends away from the body portion 158. The body portion 158 extends in a direction that is not parallel to or in line with the end of body portion 158 that is coupled to the engaging portion 162. As also shown in FIG. 3, a plane 166 is defined by and extends through the arcuate body portion 158 in between the securing portion 154 and the engaging portion 162. Though the plane 166 is shown only as a dashed line, the plane 166 extends into and out of the page as one looks at FIG. 3. The securing portion 154 of the biasing member extends away from the body portion 158 and plane 166, at approximately a right angle into a securing recess 170 of the right housing 14.

The engaging portion 162 extends away from the body portion 158 and the plane 166, such that the engaging portion 162 contacts the cutting portion 134 and biases the blade 54 so that the left shoulder 142 is engaged against the left rail 122, leaving a small gap 174 between the right rail 118 and the right shoulder 138. In some embodiments, the engaging portion 162 may extend away from the body portion 158 and the plane 166 by a distance that is 120-150% of the thickness of the cutting portion 134. With continued reference to FIG. 3, the engaging portion 162 is also arranged to engage the right shoulder 138 of the blade and bias the blade 54 towards the first end 126 of the rails 118, 122 and the blade opening 42. This biasing arrangement causes the right blade axle 146 to become engaged between the right rail 118 and an interior surface of the right housing 14 near the blade opening 42, and the left blade axle 148 to become engaged between the left rail 122 and an interior surface of the left housing 18 near the blade opening 42.

In operation, an operator identifies an area of piping or tubing to be cut, such as a ½ inch section of copper piping. The operator then places the cutting tool 10 onto the area of tubing by fitting the area of piping within the opening 22 in the C-shaped profile. The operator then ensures that the cutting portion 134 of the blade is perpendicular to and contacting an external surface of the area of piping. The operator then applies enough force to the tool 10 to cause the cutting portion 134 to puncture through the external surface of the piping, such that the shoulders of the blade 138, 142 then abut against the external surface of the piping. The operator then rotates the cutting tool 10 about the piping in the direction indicated by the indicia 66.

As the operator rotates the tool 10 about the piping, the cutting portion 134 makes a circumferential cut around the external surface of the piping and the first and second rollers 46, 50 rollably engage portions of the external surface of the piping where the cut is not occurring. During operation, the blade 54 is held stationary via friction between the shoulders 138, 142 and the external surface as the cutting portion 134 penetrates the piping. During operation, the normal force from the external surface of the piping may slightly push the blade 54 back through the blade opening 42, such that the blade axles 146 may slide along the rails 118, 122 towards the second end 130 of the rails. However, the blade 54 remains extended out of the blade opening 54 and biased towards the piping by virtue of the biasing member 150 and the rails 118, 122. Because the blade 54 is biased by the engaging portion 162 against the left rail 122 during the operation, the tool 10 is able to perform a cut which starts and ends at the same point of piping, such that the cut defines a single plane along a cross section of the piping. Once the cut is complete, the operator may remove the tool 10 from the piping and separate the piping into two sections, which have now been separated by the cut.

Because the engaging portion 162 extends away from the body portion 158 and the plane 166, the engaging portion 162 is prevented from slipping off the right shoulder 138 and becoming wedged between the right shoulder 138 and the right rail 118, in a manner that could jam the tool 10 and prevent an operator from performing subsequent operations without first disassembling the tool. Also, because the engaging portion 162 extends away from the body portion 158 and the plane 166, such that the engaging portion contacts the cutting portion 134, the left shoulder 142 is biased against the left rail 122, which makes the tool 10 less likely to perform a non-uniform or spiral cut along the area of piping (i.e. a cut that is not within a single plane along a cross section of the piping). Rather, as shown in FIG. 3, because the blade 54 is biased against the left rail 122, in some embodiments the tool is 70% less likely to perform a spiral cut, which does not start and end at the same point of piping.

Various features of the invention are set forth in the following claims.

What is claimed is:

1. A cutting tool comprising:
   a housing having a blade opening;
   an annular blade at least partially extending through the blade opening;
   a biasing member including a securing portion, an engaging portion, and a semi-circular body portion in between the securing portion and the engaging portion, the securing portion securing the biasing member to the housing within the housing, the semi-circular body portion defining a plane that bisects the entire length of the semi-circular portion, the engaging portion biasing the blade perpendicularly with respect to the plane, and the engaging portion extending away from the body portion; and
   an arcuate first rail and an arcuate second rail arranged within the housing, and wherein the blade comprises an annular cutting portion having a first side and a second side that is opposite the first side, a first shoulder on the first side and facing the first rail and a second shoulder on the second side and facing the second rail, a first axle extending outwardly from the first shoulder and a second axle extending outwardly from the second shoulder, and wherein the biasing member biases the blade such that the first axle is engaged against the first rail and the housing, and the second axle is engaged against the second rail and the housing.

2. The cutting tool of claim 1, wherein the engaging portion extends away from the body portion by a distance that is 120-150% of a thickness of the cutting portion.

3. The cutting tool of claim 1, wherein the engaging portion engages against both the first shoulder and the cutting portion.

4. The cutting tool of claim 3, wherein the engaging portion biases the blade in a direction towards the second rail.

5. The cutting tool of claim 4, wherein the second shoulder is biased against the second rail.

6. The cutting tool of claim 5, wherein there is a gap defined between the first shoulder and the first rail.

7. A cutting tool comprising:
   a housing having a blade opening;
   a biasing member including a securing portion, an engaging portion, and an arcuate body portion in between the securing portion and the engaging portion, the securing portion securing the biasing member to the housing within the housing, the engaging portion extending away from the body portion;
   a first arcuate rail arranged within the housing;
   a second arcuate rail arranged within the housing; and
   a blade having a first side including a first shoulder and a first axle extending outwardly from the first shoulder, the blade having a second side opposite the first side and including a second shoulder and a second axle extending outwardly from the second shoulder, the first shoulder facing the first rail and the second shoulder facing the second rail, the first axle and the second axle jointly defining an axis, and
   wherein the blade is biased by the engaging portion such that the first axle is engaged against the first rail and the housing, the second axle is engaged against the second rail and the housing, and at least a portion of the blade extends out of the blade opening, and wherein the blade is biased by the engaging portion in a direction parallel to the axis.

8. The cutting tool of claim 7, wherein the housing comprises a first housing portion and a symmetrical second housing portion, the first housing portion joined to the second housing portion by at least one fastener that is arranged parallel to the axis defined by the first axle and second axle.

9. The cutting tool of claim 7, wherein the housing includes a roller opening, and wherein the cutting tool further includes a roller rotatably coupled to the housing, the roller configured to rotate at least partially within the first roller opening.

10. The cutting tool of claim 7, wherein the arcuate body portion defines a plane that bisects the semi-circular portion and extends between the engaging portion and the securing portion, and wherein the engaging portion extends away from the plane.

11. The cutting tool of claim 7, wherein the engaging portion is engaged against the first shoulder and biases the blade in a direction towards the second rail.

12. The cutting tool of claim 11, wherein the second shoulder is biased against the second rail.

13. The cutting tool of claim 12, wherein there is a gap defined between the first shoulder and the first rail.

14. A cutting tool comprising:
   a housing having C-shaped profile, a blade opening, and a roller opening;
   a roller rotatably coupled to the housing and configured to rotate within the roller opening;
   a biasing member including a securing portion, an engaging portion, and an arcuate body portion in between the securing portion and the engaging portion, the securing portion securing the biasing member to the housing within the housing, the engaging portion extending away from the body portion; and
   a first arcuate rail arranged within the housing;
   a second arcuate rail arranged within the housing; and
   a blade having a first side including a first shoulder and a first axle extending outwardly from the first shoulder, the blade having a second side opposite the first side and including a second shoulder and a second axle extending outwardly from the second shoulder, the first shoulder facing the first rail and the second shoulder facing the second rail, wherein the first and second axles extend from the first and second shoulders, respectively, along an axis, and
   wherein the blade is biased by the engaging portion such that the first axle is engaged against the first arcuate rail and the housing, the second axle is engaged against the second arcuate rail and the housing, and at least a portion of the blade extends out of the blade opening, and wherein the blade is biased by the engaging portion in a direction parallel to the axis.

15. The cutting tool of claim 14, wherein the arcuate body portion defines a plane that bisects the entire length of the arcuate body portion, and wherein the engaging portion extends away from the plane.

16. The cutting tool of claim 14, wherein the engaging portion is engaged against the first side and biases the blade in a direction towards the second rail, such that the second shoulder is biased against the second rail and there is a gap defined between the first shoulder and the first rail.

* * * * *